United States Patent [19]

Christine

[11] 4,246,062
[45] Jan. 20, 1981

[54] APPARATUS FOR ATTACHING A FITMENT TO A POUCH

[76] Inventor: William C. Christine, 341 St. John St., Catasauqua, Pa. 18032

[21] Appl. No.: 23,946

[22] Filed: Mar. 26, 1979

[51] Int. Cl.³ ............................................. B65B 61/18
[52] U.S. Cl. ..................................... 156/498; 53/128; 53/410
[58] Field of Search ................. 156/69, 498, 538, 556, 156/566, 569, 253, 261, 262, 514; 53/128, 129, 410, 450, 451, 550, 551, 552, 553, 554

[56] References Cited

U.S. PATENT DOCUMENTS

| | | | |
|---|---|---|---|
| 3,069,303 | 12/1962 | Scholle | 156/253 |
| 3,783,080 | 1/1974 | Goglio | 156/514 |
| 3,821,046 | 6/1974 | Runge | 156/69 |
| 3,894,381 | 7/1975 | Christine et al. | 53/410 |
| 3,909,340 | 9/1975 | Solbeck | 156/566 |
| 4,055,032 | 10/1977 | Hammond | 53/410 |

Primary Examiner—Caleb Weston
Attorney, Agent, or Firm—Sherman Levy

[57] ABSTRACT

Apparatus for receiving fitments from a supply and transferring such fitments until one fitment is positioned in a predetermined location adjacent to a flexible thermoplastic sleeve which is used to make a pouch. In this position, a pilot pin may engage the fitment and holds the fitment while the transfer mechanism is retracted and thereafter a press forces the fitment into engagement with the pouch and the fitment is welded to the pouch by a welding mechanism located within the sleeve.

8 Claims, 8 Drawing Figures

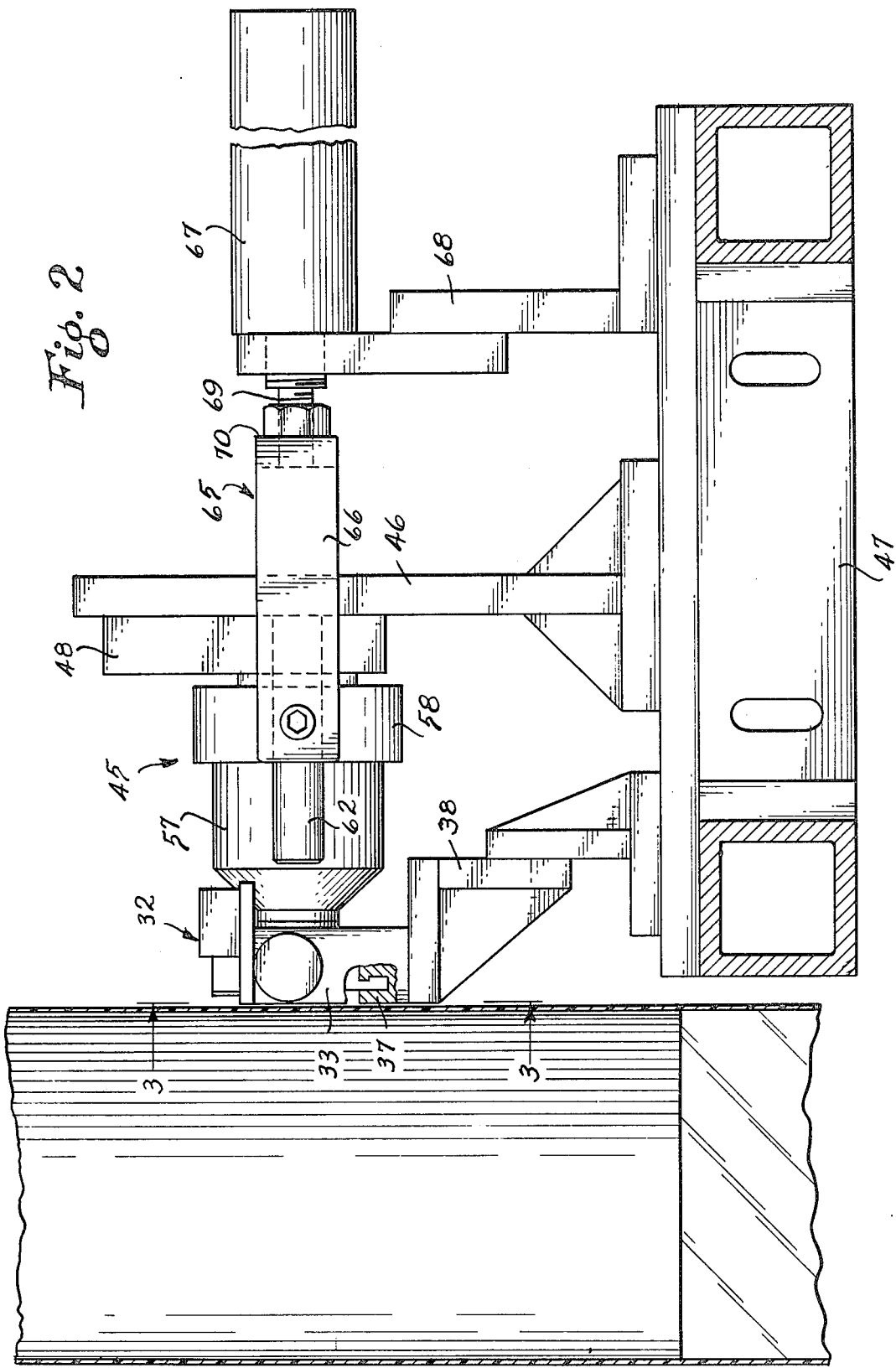

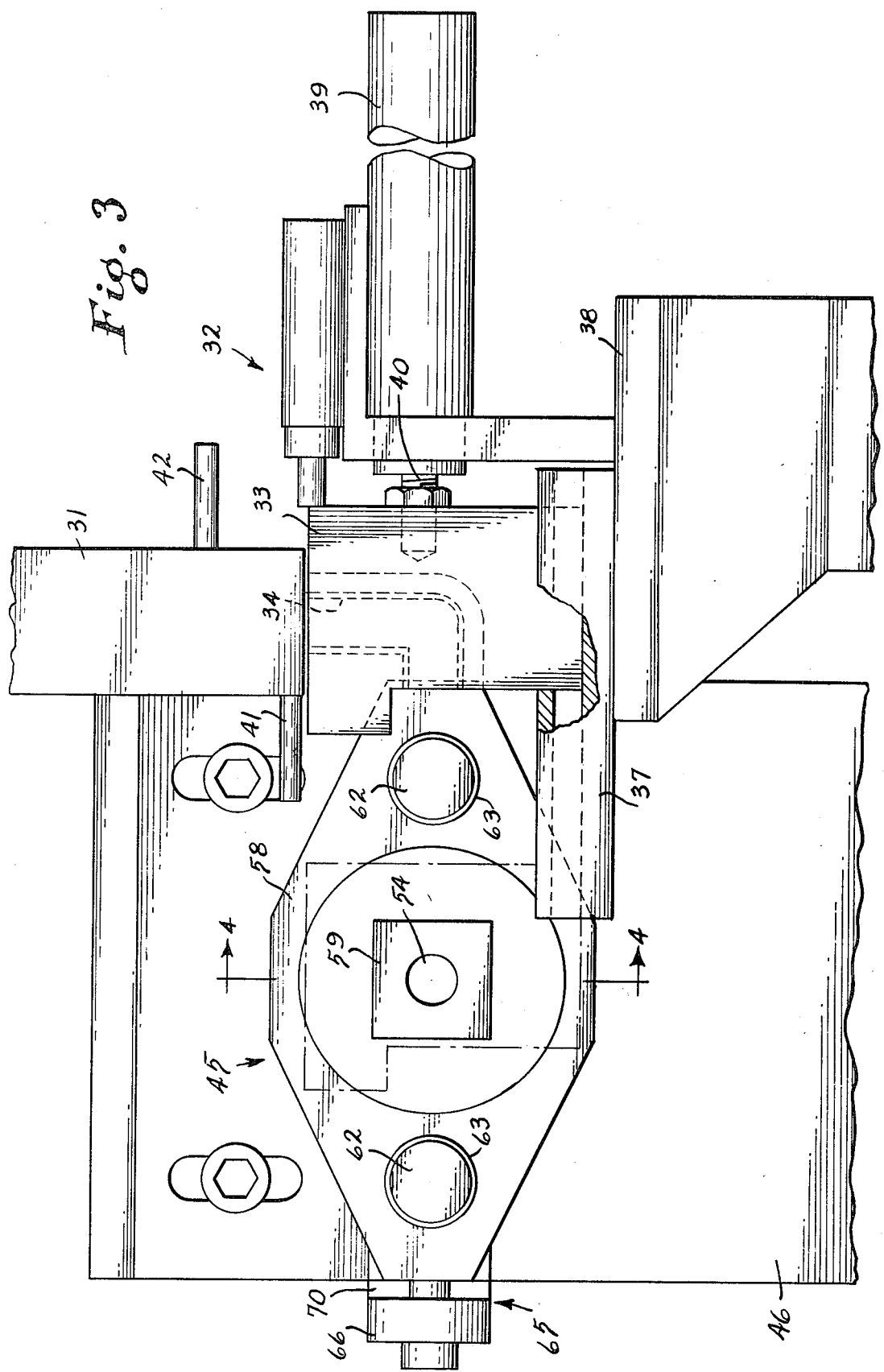

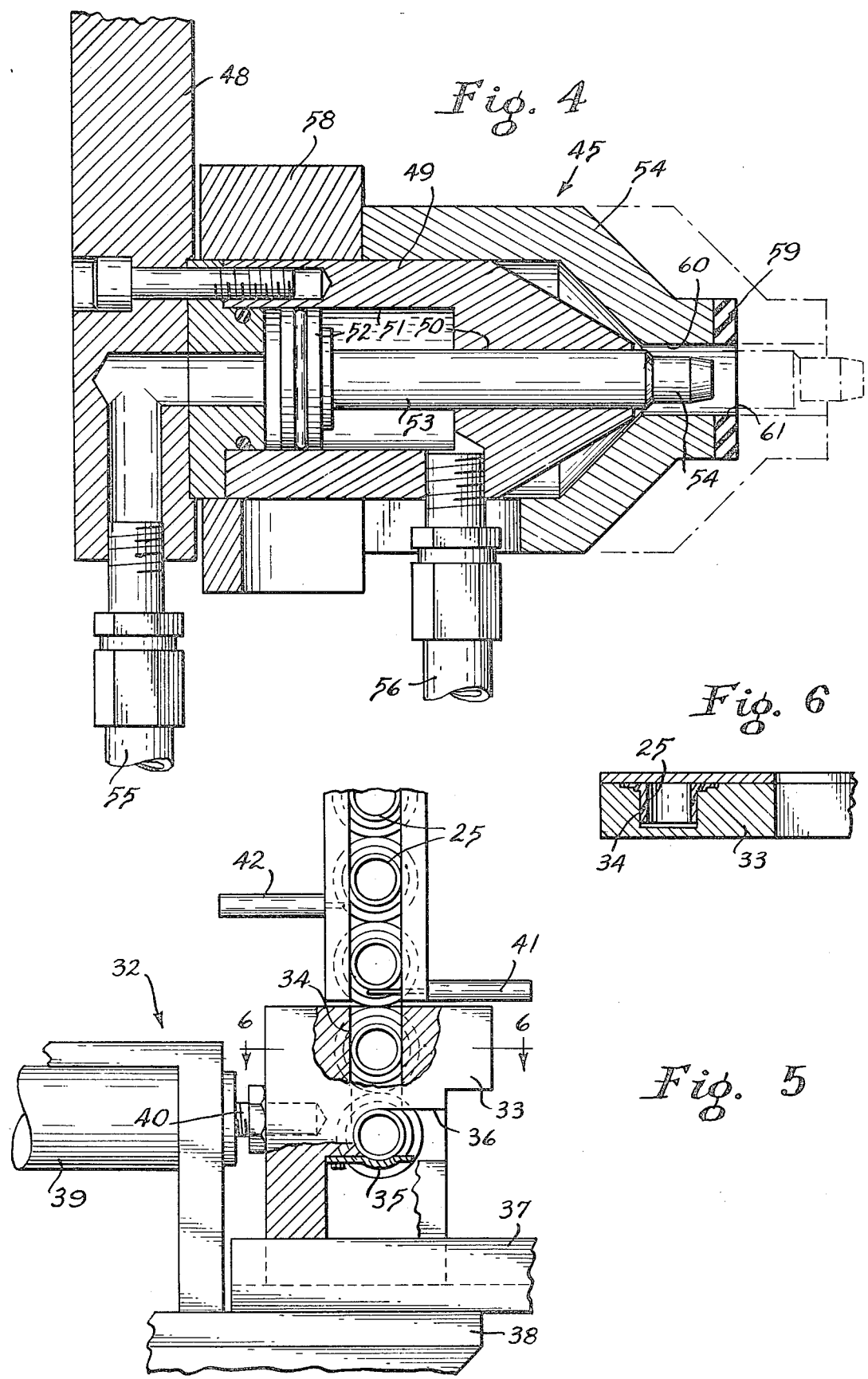

APPARATUS FOR ATTACHING A FITMENT TO A POUCH

SUMMARY OF THE INVENTION

The present invention is embodied in an apparatus which is used in conjunction with a conventional vertical form fill seal pouch making machine which continuously forms a flat strip of thermoplastic material into a tubular sleeve with the edges in abutting or overlapping relationship and then welds such edges together. The sleeve is formed about a feed tube which is connected to a supply of fluent material to be packaged and after the bottom of the sleeve is sealed, a predetermined quantity of material is discharged through the feed tube into the sleeve. Subsequently, a seal member closes and seals the sleeve above the product to provide a pouch and simultaneously seals the bottom of the next pouch and separates the filled pouch from the sleeve.

The apparatus of the present invention includes structure for attaching a fitment to the thermoplastic sleeve while the sleeve is passing through the form fill seal machine so that a fitment is disposed on each pouch which is discharged from the machine. Such apparatus includes a transfer mechanism which receives several fitments with the lowermost fitment positioned in a holder. The transfer mechanism is moved to a location in which the lowermost fitment is positioned adjacent to the thermoplastic sleeve where a pilot pin engages the fitment and holds the same while the transfer mechanism is retracted. A press which is arranged generally concentrically of the pilot pin then is advanced to press the fitment against the sleeve and into intimate engagement with a seal member mounted within the sleeve which welds the fitment to the sleeve. The apparatus is operated in intermittent timed relationship with the sleeve so that a fitment is attached in a predetermined position on each pouch and may be used to help dispense the fluent material from the pouch.

It is an object of the invention to provide an apparatus for attaching a fitment to a thermoplastic sleeve during the intermittent operation of a form fill seal machine which forms, fills and seals a plurality of pouches and such apparatus includes a transfer mechanism which moves a fitment into alignment with a pilot pin so that a press may engage and move the fitment into engagement with the sleeve and with a seal member carried within the sleeve to cause the fitment to be welded to the sleeve without perforating the material of the sleeve.

It is another object of the invention to provide a seal mechanism within a thermoplastic sleeve which is cyclically heated and cooled without warping and which applies an even pressure and temperature for completely welding the base ring of the fitment to the sleeve without perforating the material of the sleeve.

BRIEF DESCRIPTION OF THE DRAWINGS

FIG. 2 is an enlarged section taken on the line 2—2 of FIG. 1.

FIG. 3 is a sectional view taken on the line 3—3 of FIG. 2.

FIG. 4 is an enlarged sectional view taken on the line 4—4 of FIG. 3.

FIG. 5 is an enlarged side elevational view of the fitment transfer mechanism with portions broken away for clarity.

FIG. 6 is a sectional view taken on the line 6—6 of FIG. 5.

DESCRIPTION OF THE PREFERRED EMBODIMENT

Figure 1:
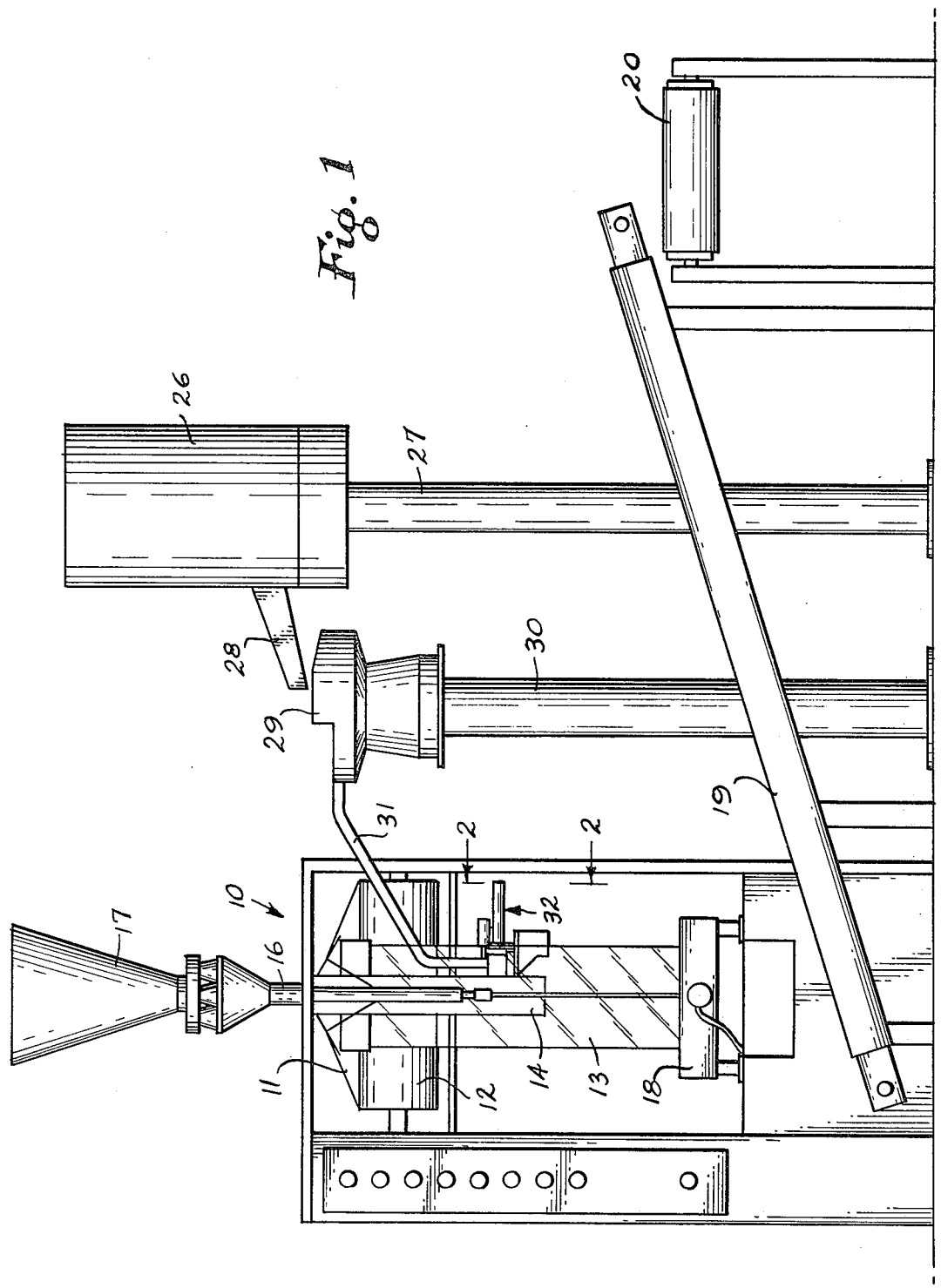
FIG. 1 is a side elevational view illustrating one embodiment of the present invention.

With continued reference to the drawings a vertical form fill seal pouch making machine 10 of conventional construction is provided which withdraws a flat web of thermoplastic film 11 from a roll 12 and forms such web into a sleeve 13 by welding the opposite edges together while the web passes through the machine. The sleeve is formed about a generally vertically disposed tubular member 14 located generally concentrically of a filling tube 15. Such filling tube is connected by a control valve 16 to a supply of fluent material, which may be in liquid, powder, or granular form, in a container 17. The fluent material may be discharged through the valve 16 and tube 15 in any desired manner as by a pump, gravity flow, or the like. Below the tubular member 14 and filling tube 15, the machine 10 has a cross seal member 18 which pinches opposite sides of the sleeve 13 together and forms a continuous seal across such sleeve. The cross seal member 18 forms a seal wide enough to close the upper end of one pouch and the lower end of a second pouch while simultaneously separating a filled pouch from the sleeve. After the lower seal has been made, the valve 16 is opened to dispense a predetermined quantity of fluent material into the lower portion of the sleeve.

Pouches which have been filled and sealed, fall by gravity from the machine 10 onto a cross conveyor 19 which carries the pouches to a second conveyor 20 and such second conveyor transports the pouches to a packaging station. The apparatus thus described is of conventional construction and forms no part of the present invention.

In order to assist in dispensing the fluent material from the pouches, it is desirable to attach a fitment 25 (FIGS. 5 and 6) to the pouches while such pouches are being formed in the machine 10 and before the fluent material is introduced into the pouch. To do this, a supply of fitments are contained within a hopper 26, which is mounted on a post 27 adjacent to the machine 15. A discharge chute 28 having a gate is mounted on the hopper 26 and dispenses a plurality of fitments from such hopper into a vibration type feed bowl 29 which is carried by a post or stand 30. A track or chute 31 has one end connected to the bowl 29 in a position such that fitments are fed into the track from the bowl until the track is substantially filled with fitments which are all oriented in the same direction. Preferably, one or more sensors (not shown) are located along the track which sense the presence or absence of fitments in the track and such sensors energize the gate of the chute 28 and the bowl 29 to supply additional fitments to the track.

With particular reference to FIGS. 3, 5 and 6, the lower end of the chute 31 terminates adjacent to a fitment transfer mechanism 32 which includes a body 33 having a guideway 34 which receives fitments 25 from the chute 31. A formed leaf spring retainer 35 has one end fixed to the body 33 and the opposite end is disposed below the guideway 34 in a position to engage and retain the lowermost fitment which is carried by the body. A laterally extending recess 36 is provided which is in alignment with the lowermost fitment for a purpose which will be described later. The body 33 is slidably mounted on a guide track 37 in a manner such that the body may be moved laterally relative to the end of the chute 31. The guide track 37 is mounted on a support structure 38 carried by the machine 10 and such support structure also carries a fluid cylinder 39 having a piston rod 40 connected to the body 33 of the transfer mechanism.

A pair of selectively operated stop pins 41 and 42 are mounted in vertically spaced relationship with each other adjacent to the discharge end of the chute 31. Such stop pins are operated in any conventional manner as by solenoids, fluid cylinders and the like with the lower stop pin 41 normally being in an extended blocking position and the upper pin 42 being in retracted position. The lower pin 41 retains the fitments 25 within the chute 31 until the transfer mechanism 32 has been extended and retracted and one of the fitments has been removed from the transfer mechanism. When the transfer mechanism has returned to its retracted position, the upper pin 42 is extended into engagement with the second lowermost fitment in the chute and the lower pin 41 is retracted to permit the lowermost fitment to fall by gravity into the transfer mechanism. Thereafter, the procedure is reversed by extending the lower pin and retracting the upper pin so that the fitments in the track fall by gravity until they are stopped by the lower pin.

When the transfer mechanism is operated, the piston rod 40 moves the body 33 laterally to the position shown in phantom lines in FIG. 3 in which the lowermost fitment carried by the transfer mechanism is located adjacent to the sleeve 13. In this position, the lowermost fitment is substantially aligned with a holding and pressing mechanism 45 (FIGS. 2, 3 and 4) which is mounted on a support plate 46 carried by a frame 47. The holding and pressing mechanism includes a base member 48 attached to the support plate 46 and such base member is provided with a fixed housing 49. Such housing has a bore 50 and counterbore 51 which slidably receives a piston 52. A piston rod 53 has one end fixed to the piston 52 and the other end is slidably mounted within the bore 50. The other end of the piston rod terminates in a pilot pin 54 of a size to be received within the bore of the fitment 25. Fluid lines 55 and 56 are connected to the housing 49 and communicate with the counterbore 51 so as to move the piston 52 in a selected direction and cause the piston rod 53 to be extended and retracted.

A movable housing 57 is slidably mounted on the fixed housing 49 with one end connected to a yoke 58 and the opposite end having a presser pad 59 attached thereto. The movable housing and the presser pad have openings 60 and 61 respectively of a size to permit the pilot pin 54 to pass through easily. The base member 58 has a pair of spaced guide bars or pins 62 extending toward the sleeve 13 and such bars are slidably received within openings 63 of the yoke 58 to guide the yoke during movement thereof. In order to move the movable housing 57 toward and away from the sleeve 13, a U-shaped push bar 65 is provided having a pair of parallel arms 66 which are attached to opposite ends of the yoke 58. A fluid cylinder 67 is mounted on a support member 68 carried by the frame 47 and such cylinder has a piston rod 69 connected to the bight portion of the push bar.

When the transfer mechanism 32 is operated to extend the body 33 to a position adjacent to the sleeve 13, fluid under pressure is introduced into the fluid line 55 to move the piston 52 and piston rod 53 to the right as illustrated in FIG. 4 so that the pilot pin 54 enters the base of the lowermost fitment in the body 33. With the lowermost fitment thus held by the pilot pin, the body 33 is retracted and the lowermost fitment is removed therefrom through the lateral recess 36. Thereafter, the fluid cylinder 67 is operated to move the push bar 65 to the left as illustrated in FIG. 2 and cause the presser pad 59 to engage the flange of the fitment 25 and force such flange against the sleeve 13 in a position to be welded or otherwise adhered thereto.

Figure 7:
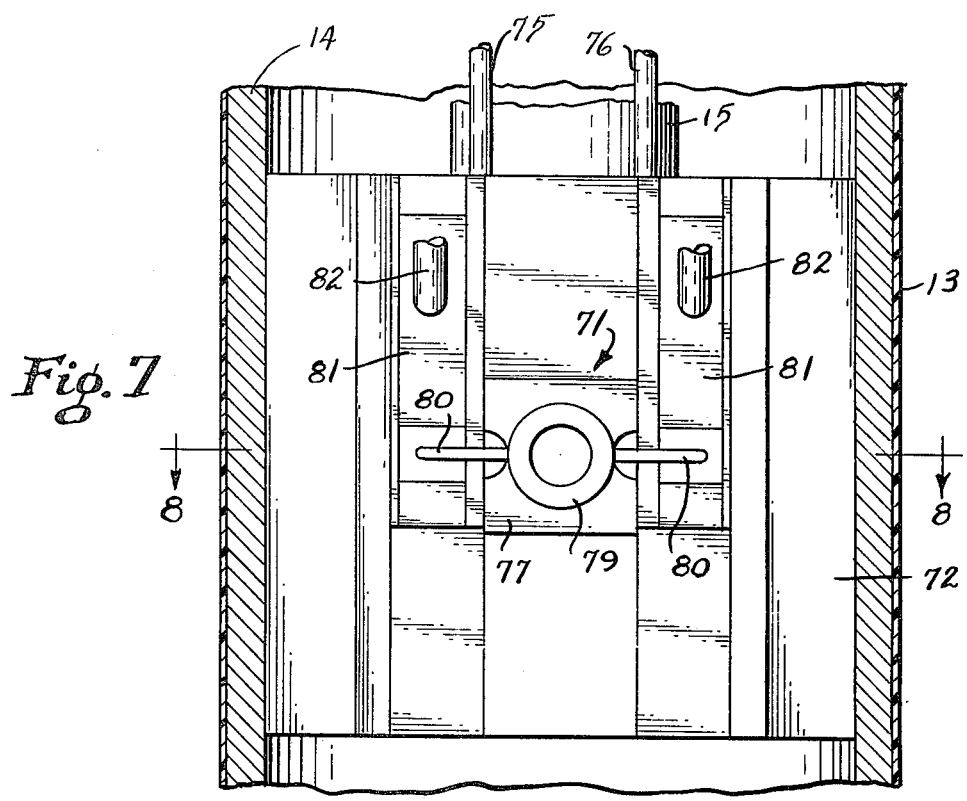
FIG. 7 is a front elevational view of the sealer.
Figure 8:
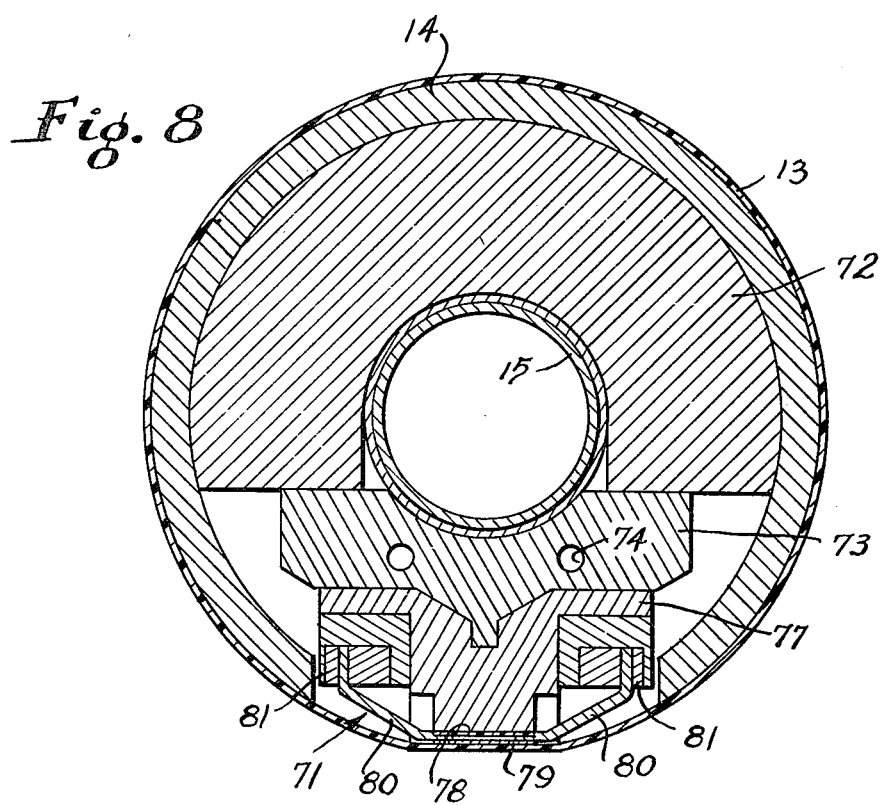
FIG. 8 is a sectional view taken on the line 8—8 of FIG. 7.

With particular reference to FIGS. 7 and 8, in order to attach the fitment 25 to the sleeve 13, a heating element 71 is mounted within the tubular member 14 substantially in alignment with the holding and pressing mechanism 45. The heating element includes a plug or support collar 72 which is mounted within the member 14 in any desired manner as by screws or the like. A coolant block 73 is secured to the support collar 72 and such block is provided with a passageway 74 which communicates with fluid conduits 75 and 76. Such conduits extend downwardly through the tubular member 14 and are connected at their upper ends to a source of cooling fluid (not shown).

A heat seal support block 77 is mounted on the coolant block 73 and such heat support block may be constructed of any heat conductive material with an aluminum bronze alloy having been found satisfactory since it is a hard material with good conductivity which may be alternately heated and cooled effectively. At the outer end of the heat seal support block 77, a thermally conductive electrically resistant thermoplastic disk 78, such as Vespel or the like, is mounted in a position to receive a heat seal ring 79. Such heat seal ring resembles a washer which is made of electrically resistant material such as Nychrome, Inconel or the like and is welded or otherwise attached to a pair of conductors 80 the opposite ends of which are connected to busbars 81 carried by the heat seal support block 77. Such busbars are connected to a source of electrical energy by electric lines 82.

It is important that the heat seal ring does not warp since any warpage tends to perforate the sleeve 13 when the fitment 25 is welded thereto. Accordingly, it has been found that ultrasonically welding the conductors 80 to the heat seal ring 79 is satisfactory, however, the heat seal ring 79 must not be restricted when electrical energy passes through the same. Therefore, the ends of the conductors are embedded within the busbars so that the heat seal ring 79 may float on the surface of the support block 77 when in use.

In the operation of the device, the form fill seal pouch making machine forms the film 11 into a sleeve 13 as the film passes through the machine. After the sleeve has been formed and the edges of the film have been joined together, the sleeve is stopped temporarily while the cross seal member seals the lower end. After the lower end is sealed, a fluid product is introduced into the bottom portion of the sleeve through the filling tube 15 until a predetermined quantity has been received. The sleeve then advances a predetermined distance and the cross seal member is operated again to simultaneously seal the upper end of the filled pouch, seal the lower end of the next pouch and separate the filled pouch from the sleeve so that the filled pouch may be discharged by the conveyers 19 and 20. During the time that the movement of the sleeve is interrupted for the cross seal member, the transfer member 32 is operated to advance the body 33 to a position contiguous to the sleeve and advance the piston rod 53 so that the pilot pin 54 enters the bore of the lowermost fitment 25 carried by such body and the body 33 is retracted. While the sleeve 13 remains stationary, the push bar 65 is operated by the cylinder 67 to advance the movable housing 57 so that the presser pad 59 engages the flange of the fitment and forces the fitment against the sleeve and at the same time forces a portion of the sleeve against the heat seal ring 79. At this time the heat seal ring is energized to weld the flange of the fitment to the sleeve. Thereafter, the holding and pressing mechanism is retracted and the heat seal ring is de-energized so that the cooling fluid in the passageway 74 cools the heat seal ring. As soon as the cross seal member 18 opens, fluent material is discharged through the filling tube and the operation is repeated.

The present invention is an improvement over prior patents and apparatus, including U.S. Pat. No. 3,894,381.

Although my invention has been illustrated and described with reference to the preferred embodiments thereof, we wish to have it understood that it is in no way limited to the details of such embodiments, but is capable of numerous modifications within the scope of the appended claims.

What is claimed is:

1. An apparatus for attaching a fitment to a sleeve of thermoplastic material comprising a body, at least one fitment carried by said body, means for moving said body and said fitment to a position adjacent to said sleeve, means for removing said fitment from said body at said position, means for pressing portions of said fitment against said sleeve, heating means located within said sleeve and in alignment with said pressing means, and means for energizing said heating means to attach said fitment to the outside of said sleeve, said body including a spring retainer for holding said fitment in a predetermined location in said body.

2. An apparatus for attaching a fitment to a sleeve of thermoplastic material comprising a body, at least one fitment carried by said body, means for moving said body and said fitment to a position adjacent to said sleeve, means for removing said fitment from said body at said position, means for pressing portions of said fitment against said sleeve, heating means located within said sleeve and in alignment with said pressing means, and means for energizing said heating means to attach said fitment to the outside of said sleeve, said means for removing said fitment including a pilot pin of a size to be received with a bore in said fitment, and means for selectively extending and retracting said pilot pin.

3. An apparatus for attaching a fitment to a sleeve of thermoplastic material comprising a body, at least one fitment carried by said body, means for moving said body and said fitment to a position adjacent to said sleeve, means for removing said fitment from said body at said position, means for pressing portions of said fitment against said sleeve, heating means located within said sleeve and in alignment with said pressing means, and means for energizing said heating means to attach said fitment to the outside of said sleeve, said pressing means including a movable housing and a fixed member, said housing being slidably mounted on said member, pushbar means attached to said movable housing, and fluid cylinder means connected to said pushbar means for selectively extending and retracting said movable housing.

4. An apparatus for attaching a fitment to a sleeve of thermoplastic material comprising a body, at least one fitment carried by said body, means for moving said body and said fitment to a position adjacent to said sleeve, means for removing said fitment from said body at said position, means for pressing portions of said fitment against said sleeve, heating means located within said sleeve and in alignment with said pressing means, and means for energizing said heating means to attach said fitment to the outside of said sleeve, said heating means including a coolant block, means for supplying a coolant to said coolant block for cooling said heating means, a heat seal support block mounted on said coolant block, and a heat seal ring carried by said heat seal support block.

5. An apparatus for attaching a fitment to a sleeve of thermoplastic material comprising a body, at least one fitment carried by said body, means for moving said body and said fitment to a position adjacent to said sleeve, means for removing said fitment from said body at said position, means for pressing portions of said fitment against said sleeve, heating means located within said sleeve and in alignment with said pressing means, and means for energizing said heating means to attach said fitment to the outside of said sleeve, said means for removing said fitment including a pilot member for selectively engaging said fitment, and means for selectively extending and retracting said pilot member.

6. An apparatus for attaching a fitment to a sleeve of thermoplastic material comprising a body, at least one fitment carried by said body, means for moving said body and said fitment to a position adjacent to said sleeve, means for removing said fitment from said body at said position, means for pressing portions of said fitment against said sleeve, heating means located within said sleeve and in alignment with said pressing means, and means for energizing said heating means to attach said fitment to the outside of said sleeve, said heating means including block means, means for supplying a coolant to said block means, and a heat seal ring carried by said block means.

7. An apparatus for use with a form fill seal pouch making machine for attaching a fitment to a sleeve of thermoplastic material comprising a transfer mechanism located in spaced relationship with said sleeve, said transfer mechanism including a body, means for moving said body toward and away from said sleeve, means for supplying at least one fitment to said body, retainer means for holding said fitment in a predetermined position on said body, holding means for removing said fitment from said body when said body is located adjacent to said sleeve, said holding means including a selectively movable pilot pin which engages said fitment and holds said fitment adjacent to said sleeve when said body is retracted, means for pressing said fitment against said sleeve, heating means located within said sleeve and generally in alignment with said pressing means, said heating means including a coolant block, means for introducing a coolant to said coolant block, a heat seal support block mounted on said coolant block, a heat seal ring carried by said heat seal support block, and means for supplying electrical energy to said heat seal ring to attach said fitment to said sleeve.

8. An apparatus for attaching a fitment to a sleeve of thermoplastic material comprising a body, at least one fitment carried by said body, means for moving said body and said fitment to a position adjacent to said sleeve, means for removing said fitment from said body at said position, means for pressing portions of said fitment against said sleeve, heating means located within said sleeve and in alignment with said pressing means, and means for energizing said heating means to attach said fitment to the outside of said sleeve, said body slidably mounted on a guide track, said means for moving said body including selectively operated fluid cylinder means, and means for supplying fitments to said body when said body is in a retracted position.

* * * * *